July 29, 1969      C. F. BUHRER ET AL      3,458,247
ELECTRO-OPTIC PRISM BEAM DEFLECTION APPARATUS Filed Dec. 17, 1965      2 Sheets-Sheet 1

INVENTORS.
CARL F. BUHRER
VERNON J. FOWLER
BY R. J. Frank
ATTORNEY.

INVENTORS.
CARL F. BUHRER
VERNON J. FOWLER
BY R. J. Frank
ATTORNEY 3,458,247
**ELECTRO-OPTIC PRISM BEAM
DEFLECTION APPARATUS**
Carl F. Buhrer, Oyster Bay, and Vernon J. Fowler,
East Meadow, N.Y., assignors to General Telephone and Electronics Laboratories, Inc., a corporation of Delaware
Filed Dec. 17, 1965, Ser. No. 514,454
Int. Cl. G02f 1/26
U.S. Cl. 350—150                         1 Claim

ABSTRACT OF THE DISCLOSURE

Apparatus for deflecting a laser beam comprising a plurality of adjacent triangular potassium dihydrogen phosphate prims forming a multi-crystal structure positioned in the path of the beam. The [001] axes of the prisms are parallel to each other and orthogonal to electrodes placed on each side of the structure. The [110] and [1$\bar{1}$0] axes of adjacent crystals are parallel. The interfaces between adjacent crystals are situated at the Brewster angle with respect to the direction of propagation of the beam thereby avoiding undesired reflection of the beam.

---

This invention relates to apparatus for deflecting a beam of electromagnetic energy and more particularly to a device for electrically controlling the direction of propagation of a light beam. The invention described herein was made in the performance of work under a NASA contract and is subject to the provisions of the National Aeronautics and Space Act of 1958, Public Law 85–568 (72 Stat. 426; 42 U.S.C. 2451), as amended.

Various methods have been used in the past to change the direction of propagation of a light beam. In one method, variable reflectors in the form of rotating mirrors driven by electric motors provide the desired deflection. Alternatively, variable reflection systems have employed vibrating mirrors actuated by electrodynamic or piezoelectric driving circuits. In another known method, deflection is accomplished by passing the light beam through a transparent material, such as a glass or quartz bar, in which intense sound waves have been set up. The sound waves cause the material to act as a diffraction grating, the deflection of the beam being controlled by the frequency of the waves. The principal disadvantage of devices employing variable reflection or variable diffraction techniques to deflect a light beam is that the speed of response is limited. Hence, they are not suitable for use in certain applications, such as scanned displays for radar and television systems.

Accordingly, it is an object of the present invention to provide improved apparatus for deflecting a light beam.

Another object is to provide an electrically controlled light beam deflecting apparatus which has an improved speed of response.

Still another object is to provide light beam deflecting apparatus in which the collimation of the incident beam is substantially retained as the beam is deflected.

Still another object is to provide a light beam deflecting apparatus wherein the size of the electrically controllable refractive elements is minimized.

In the present invention, a beam of electromagnetic energy is passed through a multi-element structure comprised of a plurality of electrically controllable refractive elements. An electrically controllable refractive element contains at least one electrically-sensitive axis, the number and location of which depend on its crystal structure. The electrically-sensitive axis is a direction in a particular element in which the application of a field produces a change in the refractive indices of the element.

The elements are positioned in the multi-element structure so that at least one electrically-sensitive axis of each element is substantially parallel to an electrically-sensitive axis of each of the other element. This direction, therefore, defines a common electrically-sensitive axis for the multi-element structure.

The structure comprising the plurality of elements contains a number of interfaces formed between the adjacent elements. The individual elements have a prismatic shape, i.e. bounded in part by two plane faces which are not parallel, so that the interfaces are at an angle with respect to the direction of propagation of the incident beam.

A uniform electric or magnetic field is applied across the refractive elements in a direction parallel to the common electrically-sensitive axis. As a result, the uniform field produces a uniform change in the refractive index of each element.

However, the individual elements are oriented in the structure such that the changes in the indices of refraction of adjacent elements are in opposite directions. Stated otherwise, the applied field increases a particular refractive index of an element while decreasing the corresponding refractive index of the adjacent elements. These variations are provided by orienting each element so that it is inverted with respect to each adjacent element.

The process of inversion may be explained by assigning an orthogonal 3-axis coordinate system to each crystal, with the axes being referred to for convenience as $x$, $y$ and $z$. To obtain an inversion it is necessary that the element be oriented or rotated so that the $x$, $y$ and $z$ axes become the $-x$, $-y$, and $-z$ axes respectively. The inversion is equivalent to a reflection in a mirror plane perpendicular to the assigned $x$ direction, which changes only $x$ into $-x$, followed by a 180 degree rotation about $-x$, which only changes $y$ into $-y$ and $z$ into $-z$. The relative orientations of adjacent elements in the structure expressed in terms of their individual crystallographic axes is determined by the particular crystal class identifying the element.

In one embodiment of the invention, a plurality of prisms formed of an electrically controllable refractive medium, such as potassium dihydrogen phosphate (KDP) are adjacently positioned to comprise a multi-element structure. The individual prisms, which may be triangular for example, are assembled such that the multi-element structure forms a rectangular bar. The light beam is transmitted lengthwise through the structure, passing successively through the large number of interfaces between the prisms. The prisms are formed so that the electrically-sensitive axis, which in the case of KDP is the [001] crystallographic axis, is perpendicular to the triangular faces of the prisms.

A pair of strip electrodes are mounted on opposing surfaces of the multi-element structure so that a voltage applied therebetween results in the application of an electric field perpendicular to the triangular faces of the prisms. The crystallographic orientation of the prisms is selected such that adjacent prisms are inverted. When a positive voltage is applied to one electrode, an increase occurs in the refractive index of alternate prisms accompanied by a decrease in the corresponding refractive index of the remaining prisms. As a result, the light beam is deflected in the same direction as it passes through each interface between prisms with the total deflection being the cumulative sum of the individual deflections.

Magneto-optic materials may be used in place of electro-optic materials. With these materials, the desired variation in the refractive index is obtained by a magnetic field of the appropriate magnitude and direction.

Further features and advantages of the present invention will become more readily apparent from the following detailed description of specific embodiments taken in conjunction with the accompanying drawings, in which.

Figure 1:
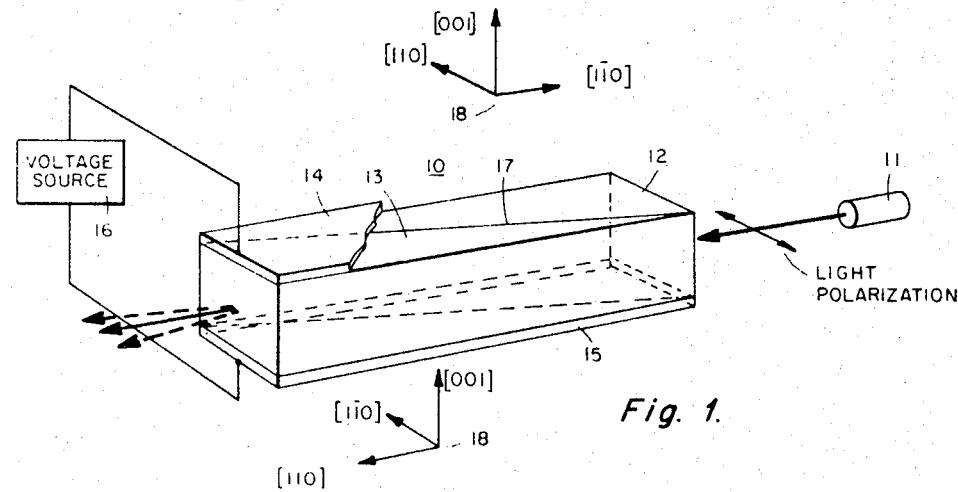
FIG. 1 is a perspective view of one embodiment of the invention.

In FIG. 1, there is shown a perspective view of the light beam deflector 10 arranged to deflect a plane polarized beam emitted by a light source 11. The beam deflector comprises anisoptropic electro-optic crystal prisms 12, 13 formed, for example of potassium dihydrogen phosphate (KDP), and a pair of strip electrodes 14, 15 mounted on opposing surfaces of the crystals. One terminal of a source of voltage 16 having a variable output is connected to strip electrode 14 and the other terminal is connected to strip electrode 15. Light source 11 is preferably one which can produce a well collimated beam of plane polarized light, such as a laser.

As indicated by the directional axes 18, adjacent FIG. 1, the electro-optic crystal 12 and light source 11 are oriented so that the beam of plane polarized light is plane polarized in the [110] direction and is propagated in the [1$\bar{1}$0] direction. The electrically-sensitive axis, which is this case is the optic axis [001] of the crystal, is vertical and orthogonal to both the [110] and [1$\bar{1}$0] direction. Electro-optic crystal 13 is shown inverted with respect to crystal 12. In the case of KDP, this inversion is provided by a rotation of 90 degrees about its optic axis [001] with respect to crystal 12 so that the beam of light is plane polarized in the [1$\bar{1}$0] direction. If the voltage output of source 16 is zero, the index of refraction for light polarized in the [110] direction is equal to the index of refraction for light polarized in the [1$\bar{1}$0] direction. As a result, the indices of refraction of crystals 12 and 13 are equal so that the beam is not deflected as it passes through the interface between crystals 12 and 13 and emerges from the structure undeflected.

When the magnitude of voltage source 16 is increased from zero, a voltage difference is produced between electrodes 14 and 15. The resulting electric field produces a variation in the refractive indices of crystals 12 and 13 in both the [110] and [1$\bar{1}$0] directions. In crystals 12, the electric field causes the refractive index in the [110] direction, which is the direction of polarization of the beam, to increase. Since the field is uniformly applied to crystal 12, the index of refraction is likewise uniform and the direction of the beam as it travels through crystal 12 remains unchanged.

In crystal 13, the electric field causes the refractive index in the [1$\bar{1}$0] direction, which is the direction of polarization of the beams, to decrease. Since the field is uniformly applied to crystal 13, the index of refraction is similarly uniform in the direction of polarization of the beam. However, when the field is applied, interface 17 is formed by two crystals having different indices of refraction in the direction of polarization of the beam. As a result, the beam is deflected as it passes through the interface. The direction of the deflection can be reversed by reversing the polarity of voltage 16 since the direction of the change in the index of refraction of the crystals is determined by the direction of the electric field.

Figure 2:
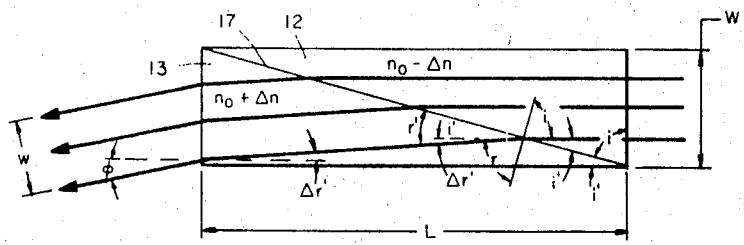
FIG. 2 is a schematic plan view of the embodiment of FIG. 1.

Referring now to FIG. 2, a beam of light is shown being deflected as it travels through deflector 10 of FIG. 1 for the case where the polarity of the voltage applied to electrode 14 by source 16 is negative with respect to electrode 15. The index of refraction of crystal 12 is decreased from its unenergized value $n_o$ to $n_o - \Delta n$. At the same time, the index of refraction of crystal 13 is increased from its unenergized value $n_o$ to $n_o + \Delta n$. The beam is shown normal to crystal 12 so that it is not deflected upon entering crystal 12.

However, the beam is deflected upon passing through interface 17 and entering crystal 13. The amount of deflection is determined by the difference between the refractive indices of the crystals and by the angle of incidence $i$ between the normal to interface 17 and the beam direction. The following analysis is expressed in terms of angles $i'$ and $r'$ with $i'$ being the complement of the angle of incidence $i$ and with $r'$ being the complement of the angle of refraction $r$. The angle $r'$ is then expressed as follows:

$$\cos r' = [(n_o - \Delta n)/(n_o + \Delta n)] \cos i'$$

Since $i' = r'$ in the absence of an applied signal (i.e., when $\Delta n = 0$), the angle $r'$ can be expressed as $$r' = i' + \Delta r'$$

where $\Delta r'$ is the change in the refraction angle produced by the changes in the refraction indices of the crystals. It is also shown in FIG. 2 that $\Delta r'$ is the angle of incidence of the beam as it passes through the surface of crystal 13 into the air. The angle of refraction $\phi$ at this surface is expressed as $$\sin \phi = (n + \Delta n) \sin \Delta r'$$

where $\phi$ is the angle by which the light beam has been deflected in passing through the entire structure.

The angle $\phi$ can also be expressed by the following approximate formula in terms of the induced change in refractive index $\Delta n$ as $$\phi = 2\Delta n/i'$$

where $i$ is expressed in radians. Since the angle $$i' = \tan^{-1}(W/L)$$

where W is the width and L is the length of the structure, which for small angles may be reduced to $$i' = W/L$$

the deflection angle $\phi$ can be expressed as $$\phi = 2\Delta n L/W$$

It will be noted that the deflection angle of the above-described embodiment is expressed in terms of the length and width of the structure. However in embodiments wherein the interfaces do not extend throughout the entire length and/or width, the quantities L and W are taken to be the horizontal and vertical projections of the interface.

Using a well-collimated parallel light beam, such as can be obtained from laser 11, a cone of light can be produced having a theoretical minimum beam angle which is limted by diffraction to $$\theta = \lambda_o/w$$

where $\theta$ is the angle formed by the intercepts of the cone on a plane containing the cone axis, $\lambda_o$ is the free-space wavelength, and $w$ is the width of the light beam as it emerges from the beam deflector.

The number of distinguishable beam directions N contained within the beam deflection angle is then $\phi/\theta$ and is equal approximately to $2\Delta n(L/\lambda_o)/(w/w)$. At room temperature, values of $\Delta n$ somewhat larger than $0.5 \times 10^{-4}$ can be produced in KDP, L can be about one foot and $w$ made approximately equal to W. Thus, for a visible gas laser light beam at $0.6328 \times 10^{-4}$ cm., N is approximately equal to 50.

Figure 3:
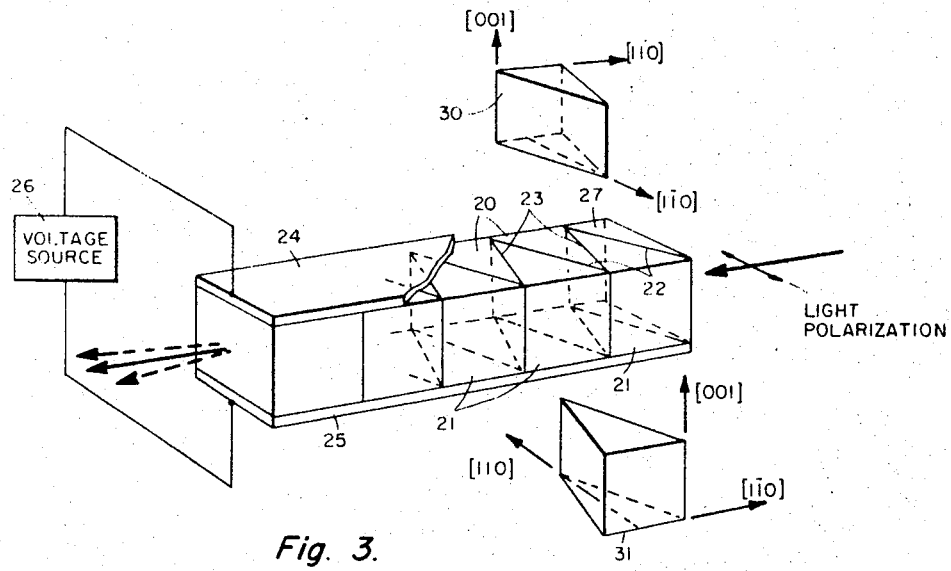
FIG. 3 is a cutaway perspective view of a second embodiment of the invention.

A second embodiment of the beam deflector employing a plurality of triangular electro-optic crystal prisms having base angles of 45 degrees is shown in FIG. 3. The prisms 20, 21 are single crystals of a suitable electrically controllable refractory medium, such as KDP. The prisms are positioned to form a multi-element structure having a plurality of interfaces 22, 23 therein with the triangular faces of the prisms forming opposing surfaces of the structure. A pair of strip electrodes 24 and 25, formed on the structure, are connected to voltage source 26 which provides electric fields perpendicular to the triangular faces.

For crystals comprised of KDP, the index of refraction is caused to vary by the application of electric fields in the [001] direction of the crystal. Positive fields, i.e. where electrode 24 is positive with respect to electrode 25, in this direction to cause the index $n$ to increase for light polarized in the [1$\bar{1}$0] direction and negative fields cause it to decrease. The indices of refraction of the left prisms 20 are made to vary in the opposite direction from those of the right prisms 21 by rotating the [110] and [1$\bar{1}$0] directions 90 degrees about the [001] direction as shown by the corresponding crystal axes 30 and 31. Thus, each crystal is inverted with respect to its adjacent crystals.

Figure 4:
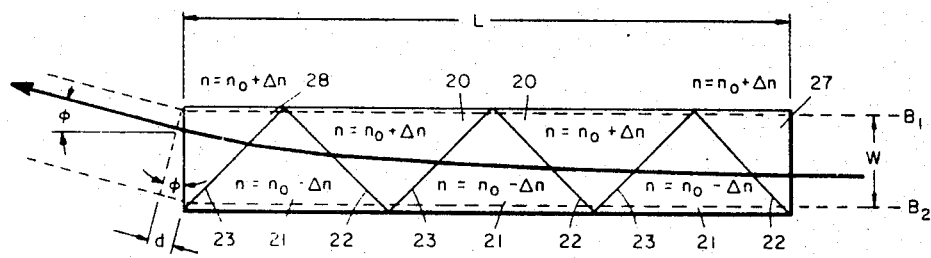
FIG. 4 is a schematic plan view of the embodiment of FIG. 3.

Referring now to FIG. 4, the light beam which is polarized in the horizontal plane is shown entering a left prism 20 at a time when a positive electric field is applied to the structure. As a result, the indices of refraction of the left prisms 20 are increased to a value $n_0 + \Delta n$ while the indices of refraction of the right prisms 21 are decreased to a value of $n_0 - \Delta n$.

The light beam is refracted as it passes through the interfaces 22 and 23 in the structure. The effect of the multiple refractions is cumulative so that the beam is defleced as it emerges from the structure. The cumulative aspect of the structure is due to the beam being refracted away from the normal to interfaces 22 since it enters a prism 21 having a lower refracive index and toward the normal to interfaces 23 when it enters a prism 20 having a higher refractive index.

It will be noted that although the adjacent prisms of both embodiments are shown having a relative rotation of 90 degrees about the [001] direction, an inversion is also obtained by reversing the [001] direction in adjacent crystals to thereby reverse the [110] or [1$\bar{1}$0] directions accordingly. Other refractive mediums may require different relative orientations to provide the desired inversion. In addition, short end crystals 27, 28 can be replaced with a suitable liquid, such as silicone oil, having a refraction index closely matching $n_0$. This same oil may be used between prisms to insure intimate contact and minimize any internal reflections that may occur.

The base angles of the trianular prisms are selected to be 45 degrees so that the angle of incidence at the interfaces is substantially 45 degrees. This angle is the Brewster angle for mediums with closely matching indices of refraction and is chosen to minimize interanl reflections of the beam. The Brewster angle is the angle in which light polarized in the plane of incidence experiences no reflection losses. However, other base angles may be employed if desired.

The deflection angle $\phi$ shown in FIG. 4 is determined by the change in the refractive index $\Delta n$ and the length $L$ and width $W$ of the structure. The angle $\phi$ is expressed by the same relation controlling the embodiment of FIG. 1

$$\phi = 2\Delta nL/W$$

This equivalence of deflection may be shown by considering that a beam of light $B_1$ travelling through one side of the structure undergoes a total phase shift relative to the entering light of $2\pi/\lambda_0(n_0 + \Delta n)L$ since its path is only through crystals 20. Likewise, the phase shift for light beam $B_2$ on the other side of the structure is $$2\pi/\lambda_0(n_0 - \Delta n)L$$

Thus, the phase difference between light emerging from each side of the structure is the difference between the above or $$4\pi L \Delta n/\lambda_0$$

The relative distances traveled by the light beams in a constant phase plane after emerging from the structure is $2\pi d/\lambda_0$, where $d$ is the additional distance travelled by beam $B_2$. Equating the two expressions:

$$2\pi d/\lambda_0 = 4\pi/\lambda_0 L \Delta N$$

and $$d = 2L\Delta n$$

Further, $\sin \phi = d/W$ so that for small angles $\phi$ is approximately equal to $2L\Delta n/W$.

Figure 5:
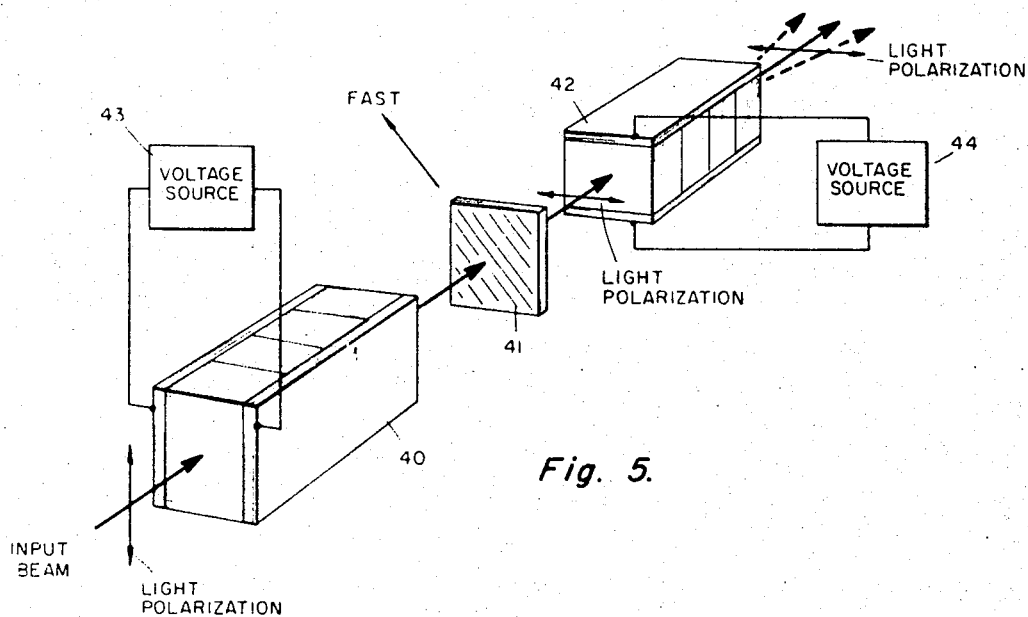
FIG. 5 shows a two dimensional light beam deflector constructed in accordance with the invention.

FIG. 5 depicts schematically a two-dimensional deflector in which polarized light is passed through two beam deflectors of either the FIG. 1 or FIG. 3 type and through a polarization converter interposed between the two deflectors. As shown in FIG. 5, vertically polarized light impinges on a vertical deflector 40, passes through a half-wave plate 41, and then through a horizontal deflector 42. The beam which emerges from deflector 42 can be deflected in the vertical direction by applying a voltage to deffector 40 from source 43 and in the horizontal direction by applying a voltage to deflector 42 from source 44. Thus, the output beam may be steered in two dimensions.

Deflectors 40 and 42 both contain KDP electro-optic crystals as previously described. However, the deflectors are positioned so that the crystal directions along which the changes in refractive index occur are at right angles to each other.

Polarization converter 41 changes the vertically polarized light leaving vertical deflector 40 to horizontally polarized light. The fast axis of half wave plate 41 is at 45 degrees to the vertical and horizontal direction and therefore there is a 90 degree displacement between the plan of polarization of the incident beam and the beam emerging from the plate 41.

What is claimed is:
1. Apparatus for deflecting a beam of plane polarized electromagnetic energy which comprises:
 (a) a plurality of triangular potassium dihydrogen phosphate prisms adjacently positioned in the path of said beam to form a multi-crystal structure having a common electrically-sensitive axis and at least one interface therein, each of said crystals having mutually orthogonal [001], [110] and [1$\bar{1}$0] axes with the [001] axes corresponding to said common electrically-sensitive axis and being normal to the plane of polarization of said beam, the [110] and [1$\bar{1}$0] axes of adjacent crystals being parallel to each other and the angle between the interface formed by adjacent prisms and the direction of propagation of said beam being equal to approximately 45 degrees to avoid undesired reflection of the beam, and
 (b) first and second electrodes spaced on opposing sides of said multi-crystal structure normal to the direction of said common electrically-sensitive axis, the application of an electric field across said electrodes establishing an inequality between the indices of refraction of adjacent prisms thereby causing said beam to be deflected at said interface through an angle determined by the inequality in the indices of refraction of said adjacent prisms.

References Cited

UNITED STATES PATENTS 3,305,292   2/1967   Miller _____ 350—150

OTHER REFERENCES

Kulcke et al., "A Fast, Digital-Indexed Light Deflector," IBM Journal of Res. & Dev., vol. 8, No. 1, January 1964, pp. 64–67.

DAVID SHONBERG, Primary Examiner

P. R. MILLER, Assistant Examiner

U.S. Cl. X.R.

350—157, 160